Nov. 1, 1932.  E. P. POLUSHKIN  1,885,762
SCREEN
Filed Feb. 4, 1930  2 Sheets-Sheet 1
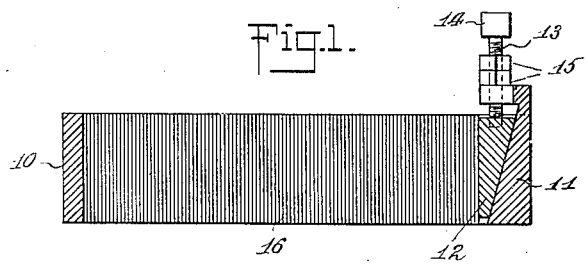
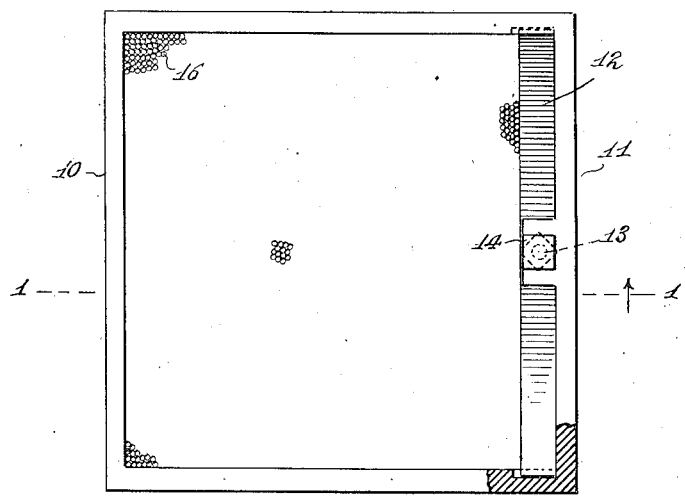
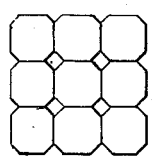
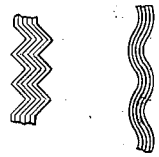
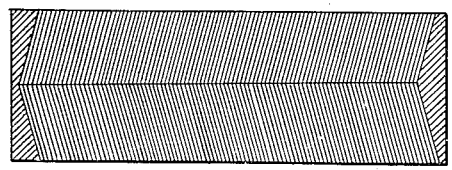
INVENTOR.
Eugene P. Polushkin
BY Munn & Co.
ATTORNEYS.

Nov. 1, 1932.  E. P. POLUSHKIN  1,885,762
SCREEN
Filed Feb. 4, 1930   2 Sheets-Sheet 2
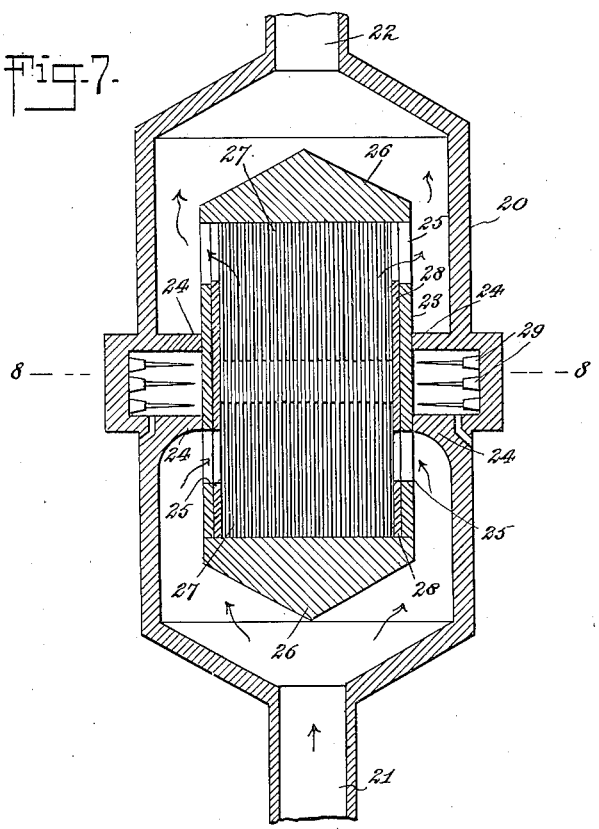
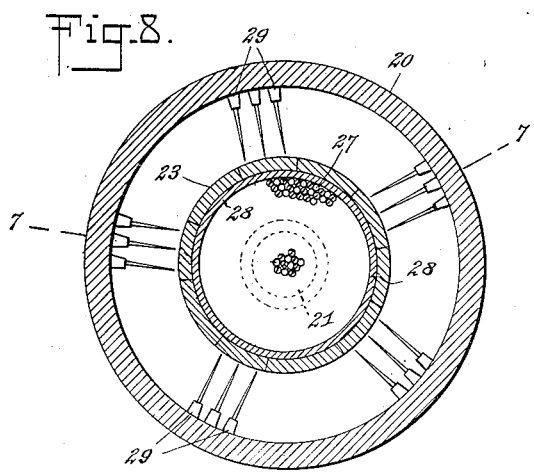
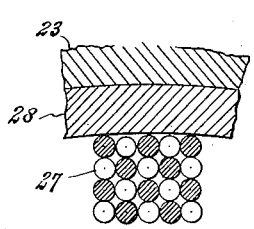
INVENTOR
Eugene P. Polushkin
BY
ATTORNEYS Patented Nov. 1, 1932

1,885,762

UNITED STATES PATENT OFFICE

EUGENE P. POLUSHKIN, OF NEW YORK, N. Y.

SCREEN

Application filed February 4, 1930. Serial No. 425,909.

This invention relates to screens.

It is among the objects of the present invention to provide a novel and improved porous screen for use in physical and chemical apparatus.

It is a further object of the present invention to provide a screen formed by a plurality of longitudinally contacting wires, fibres or the like to provide a fagoted porous screen.

A further object of the present invention is to provide a screen formed of a plurality of wires or the like, together with means for varying the transverse tension between the wires, thus to provide for variations in the porous characteristics of the screen and to provide readily operable means for cleaning the screen.

Another important object of the present invention is to provide a porous screen of the character described formed by a pair of oppositely arranged sectors having interlacing means, the structure thus formed being particularly adapted for heat exchange apparatus or the like, and being readily cleaned by disengagement between the sectors.

By the construction of the present invention, as shown in the drawings, it will be seen that the device is applicable for use as a filter and it may also be applicable for use in various physical and chemical reactions, such as superheating and condensation of vapors and other heat exchange systems, or for atomizing and the like. In such apparatus a close contact of a finely divided liquid or gas with the substance of the filter is required for the proper transmission of heat or the like. For this reason it can be used for heating and cooling the fluids and gases, instead of the coils. As its contact surface is many times greater than that of the coil of the same volume, the fagoted filter gives greater efficiency, and, therefore, may be of a smaller size than the coil.

The invention is also applicable for use in chemical reactions such as oil hardening, diffusion and distillation. In such reactions, the device may be used as a catalyzer and is so constructed as to provide a large contact area for material passing therethrough as compared with the dimensions of the screen.

By the present construction it will be seen that the screen provides a device adapted to sustain without destruction or deterioration, high temperatures and wide temperature changes, as well as temperature differences throughout the various portions of the screen. The screen is also adapted to sustain considerable pressures and it will be seen that the device may be used simultaneously as a filter and/or a heat exchanger and/or as a chemical applicator or catalyst. The wires of the screen may be manufactured of material to act as a catalyst. It will also be seen that the material of the filter may be formed of electrical conducting medium whereby material passing therethrough may be subjected to electrical treatment with or without action of the device as a filter. It will also be seen that by the construction of the device, the passages therethrough will be of substantially uniform shape and area, and by modification of the wires may be arranged to form a tortuous path for the material.

Other objects of the present invention will be apparent from a consideration of the following specification taken in conjunction with the accompanying drawings, in which Figure 1 is a transverse sectional view of one form of the present invention, being taken on the line 1—1 of Fig. 2;

Fig. 2 is a top plan view of that form of the invention shown in Fig. 1;

Figs. 3 and 4 are side views of modified forms of the wires which may be used in the present device;

Fig. 5 is an end elevation of a further modified form of wire which may be used;

Fig. 6 is a sectional view of one form of the device, showing the use of two angularly related sets of wire.

Fig. 7 is a vertical sectional view of a heat exchange apparatus formed in accordance with the present invention, the view being taken on the line 7—7 of Fig. 8;

Fig. 8 is a horizontal sectional view on the line 8—8 of Fig. 7, and

Fig. 9 is a detail fragmentary view showing the relationship of the wires in the central portion of the helix change device.

Referring more particularly to the drawings, it will be seen that the invention includes a frame 10 of suitable configuration, one wall of which, as indicated at 11, is preferably tapered to provide an inner slanting surface with which a screw-controlled block 12 is adapted to cooperate, an operating screw 13 being associated therewith to control the vertical movement of the block whereby its relation to the opposite wall may be conveniently varied. As shown in Fig. 1 of the drawings, the screw 13 is provided with an angular operating head 14 and suitable lock nuts 15. It will be understood that the present invention is not confined to the configuration or mechanical structure of the frame as herein shown by way of illustration, it being understood that numerous changes, modifications, and the full use of mechanical equivalents may be used in the formation of the device.

The porous body of the screen is formed by a plurality of wires, fibres, or the like, indicated at 16. The wires 16 are arranged transversely within the frame 10 and are adapted to be secured within the frame by the transverse pressure applied therein through the medium of the adjustable block 12. It will be readily seen that the longitudinal contact of adjacent wires provides longitudinal spaces of small dimension therebetween. In the drawings, the wires have been indicated as of uniform length; it is, however, obvious that their length may be varied whereby a substantially convex or concave screen may be provided, if desired. In certain reactions it may be desired to provide a screen of convex configuration whereby a stream of fluid may be directed against the center of the screen, whereby its faster moving particles will pass between the longer wires, while the slower moving particles will pass between the shorter wires, thus to provide uniform time contact of the fluid with the material of the screen. As indicated in Figs. 3 and 4, it will be seen that the invention is not specifically confined to the use of straight wires or fibres. Thus, if a tortuous path for the medium passing through the screen is provided, suitably shaped wires may be used, the provision of an angular passage being provided by the angular wires shown in Fig. 3, while a curved tortuous path is provided by the curved wires illustrated in Fig. 4.

As indicated in Fig. 5, it will be seen that the cross section of the wires may be of various characteristics. The square wire with beveled edges, as shown in Fig. 5, will provide passages substantially rectangular in cross section. If desired, the cross section may depart from the uniform to provide a passage of various cross sectional areas throughout its length. The wires are preferably very thin to provide narrow passages through the screen, one preferred dimension being 0.005 of an inch. By such dimensions of the wires, it will be seen that substantially capillary channels are formed through the filter. It will also be understood that to supplement the transverse pressure for uniting the wires into a fagoted screen, suitable connecting means between the wires may be used, such as solder or the like. As shown in Fig. 6, the screen may provide tortuous passages therethrough either angular or curved, by the provision of abutting angularly related sets of wires and the frame should conform with the shape of the wire.

Referring more particularly to Figs. 7, 8 and 9, it will be seen that the present invention comprehends a structure particularly adapted for heat exchange. The structure shown by way of illustrating this feature of the invention, includes an external casing 20 having a lower inlet conduit 21 and an upper outlet conduit 22. It will be understood, of course, that the direction of passage from the bottom to top as here illustrated, is not required, and that the reverse may be used, if desired. It will also be understood that the invention is in no way confined to the specific structural details here shown, but that modifications of the arrangement may be readily resorted to without departing from the spirit or scope of the invention.

Centrally arranged within the chamber 20, a substantially cylindrical chamber 23 is provided, the chamber 23 being supported by inwardly extending walls 24, which constitute a central annular combustion chamber around the inner chamber 23. The upper and lower ends of the chamber 23, above and below the combustion chamber, are provided with openings 25 for the admission and exit of fluids through the central chamber. The ends of the chamber are closed by suitable end blocks 26, the inner faces of which are fitted with wires 27, the wires in one end being out of alinement with the wires attached to the block at the opposite end, whereby they will intermesh at the central section to provide a fagoted screen substantially similar in structure and in operation to the screen shown in Figs. 1 to 6, inclusive. The preferred structure herein presented further includes inner bands 28 which provide for the proper alining and securing of the fibres in position.

In the operation of this form of the invention, the fluids which are to be heated are admitted to the passage 21 and enter the lower openings 25 in the inner chamber 23 and pass longitudinally along the wires 27 to the interlaced portion thereof, which constitutes the fagoted screen. Here the fluid, by virtue of the small dimensions of the spacing between the wires of the screen, is brought into intimate contact with the surfaces of the wires for efficient heat exchange relation and is subsequently discharged through the upper openings 25 in the inner chamber and may pass thereout through the outlet passage 22. This structure is also particularly adapted for the reverse heat exchange operation. In such instances, a cooling fluid may be provided in the annular chamber in place of the application of heat as here shown. It will readily be seen that this form of the invention provides for readily cleaning, it being understood that for such cleaning, the blocks 26 may be separated, whereby the wires or fagots are separated, thus permitting the taking out of the blocks with attached wires for separate cleaning. It will be understood, of course, that the heat exchange is or may be accompanied with filtration or catalytic or electrical application as described in connection with the form of the invention shown in Figs. 1 to 6. In this form of the invention, the ends of the wires adjacent their respective blocks, provide preliminary filtration contact or the like prior to the subjection of the fluid to the fine filtration or heat exchange at the interlaced portions of the wires forming the fagoted central screen.

In the form of the invention shown in Figs. 7, 8 and 9, it will be seen that the fagoted screen provides a novel and improved heat conducting medium which includes narrow openings therethrough of a size commensurate with capillary tubes, whereby the fluid passing through is brought into intimate heat exchange contact with a heat conductor. Other forms of heat exchange devices operating by virtue of a fagoted screen of the character here shown, are contemplated, the invention not being confined to the specific structural features here shown.

What is claimed is:

1. A screen including a surrounding frame, a plurality of longitudinally contacting wires retained under transverse compression therein, and means for varying said transverse compression applied to said wires, said means comprising a tightening member movably carried by said frame, said frame and member having contacting cam surfaces whereby movement of said member longitudinally of said wires will move said member transversely thereof to vary the transverse compression thereon.

2. A screen formed by a plurality of variously bent longitudinally contacting wires, said wires being similarly bent to provide uniform longitudinal contact therebetween, and a frame for retaining said wires, said frame having an inner surface conforming with the configuration of said wires.

3. A device of the character set forth including a screen formed by a plurality of sets of spaced wires interlaced to form a section of closely arranged longitudinally contacting wires.

4. A device of the character set forth including a screen formed by a plurality of sets of spaced wires interlaced to form a section of closely arranged longitudinally contacting wires, each of said sets being individually movable to control the width of said section and to permit removal thereof for cleaning.

5. An apparatus of the class described, including a supply and exhaust conduit, and a screen therebetween formed by a plurality of independent wire-carrying sections, the wires of said sections interlacing to form a fagoted screen.

6. A heat exchange apparatus including a supply and exhaust conduit, a screen therebetween formed by a plurality of independent wire-carrying sections, the wires of said sections interlacing to form a fagoted screen, said screen constituting a heat conductor and a heating chamber adjacent the interlaced portions of the wires.

7. A heat exchange apparatus including a supply and exhaust conduit, a screen therebetween formed by a plurality of independent wire-carrying sections, the wires of said sections interlacing to form a fagoted screen, said screen constituting a heat conductor, and means for applying heat to said screen.

8. An apparatus of the class described, comprising an outer casing having inlet and exhaust conduits, an internal chamber within said casing, blocks carried by the ends of said chamber, each of said blocks including inwardly extending spaced wires, the terminals of said wires interlacing to form a fagoted screen.

9. An apparatus of the class described, comprising an outer casing having inlet and exhaust conduits, an internal chamber within said casing, blocks carried by the ends of said chamber, each of said blocks including inwardly extending spaced wires, the terminals of said wires interlacing to form a fagoted screen, and means for directing fluid through said fagoted screen.

10. A heat exchange apparatus comprising an outer casing having inlet and exhaust conduits, an internal chamber within said casing, blocks carried by the ends of said chamber, each of said blocks including inwardly extending spaced wires, the terminals of said wires interlacing to form a fagoted screen, means for directing fluid through said fagoted screen, and heat-applying means associated with said casing.

11. A heat exchange apparatus comprising an outer casing having inlet and exhaust conduits, an internal chamber within said casing, blocks carried by the ends of said chamber, each of said blocks including inwardly extending spaced wires, the terminals of said wires interlacing to form a fagoted screen, means for directing fluid through said fagoted screen, and heat-applying means associated with said casing, comprising an annular combustion chamber around said chamber.

12. A heat exchange apparatus comprising an outer casing having inlet and exhaust conduits, an internal chamber within said casing, blocks carried by the ends of said chamber, each of said blocks including inwardly extending spaced wires, the terminals of said wires interlacing to form a fagoted screen, means for directing fluid through said fagoted screen, and heat-applying means associated with said casing, comprising an annular combustion chamber around said chamber adjacent the fagoted screen.

13. A screen including a surrounding frame, a plurality of longitudinally contacting wires retained under transverse compression therein, and means movable longitudinally of said wires for modifying said transverse compression.

EUGENE P. POLUSHKIN.